Figure 1:
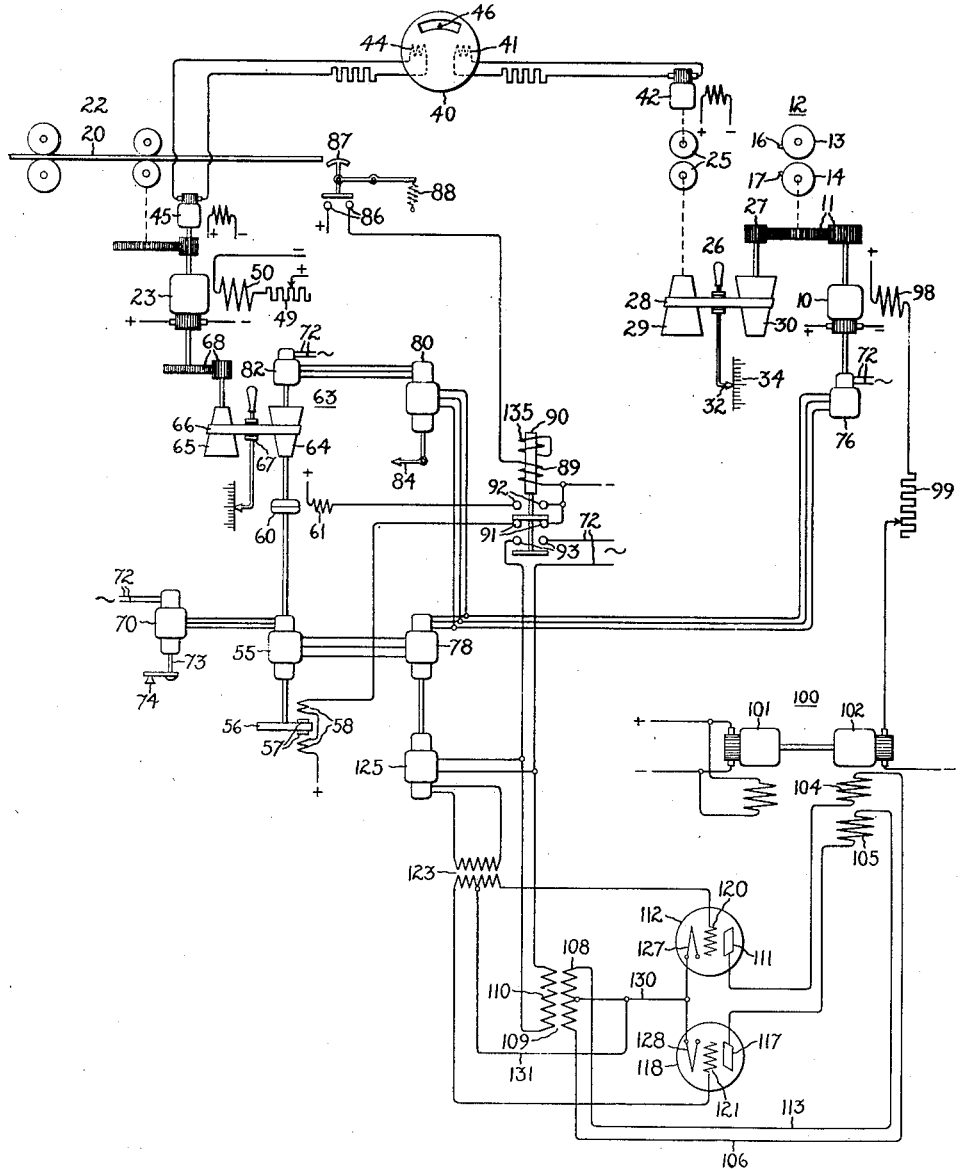

Dec. 3, 1935.  T. R. RHEA ET AL  2,023,243

CONTROL SYSTEM

Filed June 8, 1933  2 Sheets-Sheet 1

Inventor:
Thomas R. Rhea,
Leonid A. Umansky,
by Harry E. Dunham
Their Attorney.

Dec. 3, 1935.　　T. R. RHEA ET AL　　2,023,243
CONTROL SYSTEM
Filed June 8, 1933　　2 Sheets-Sheet 2
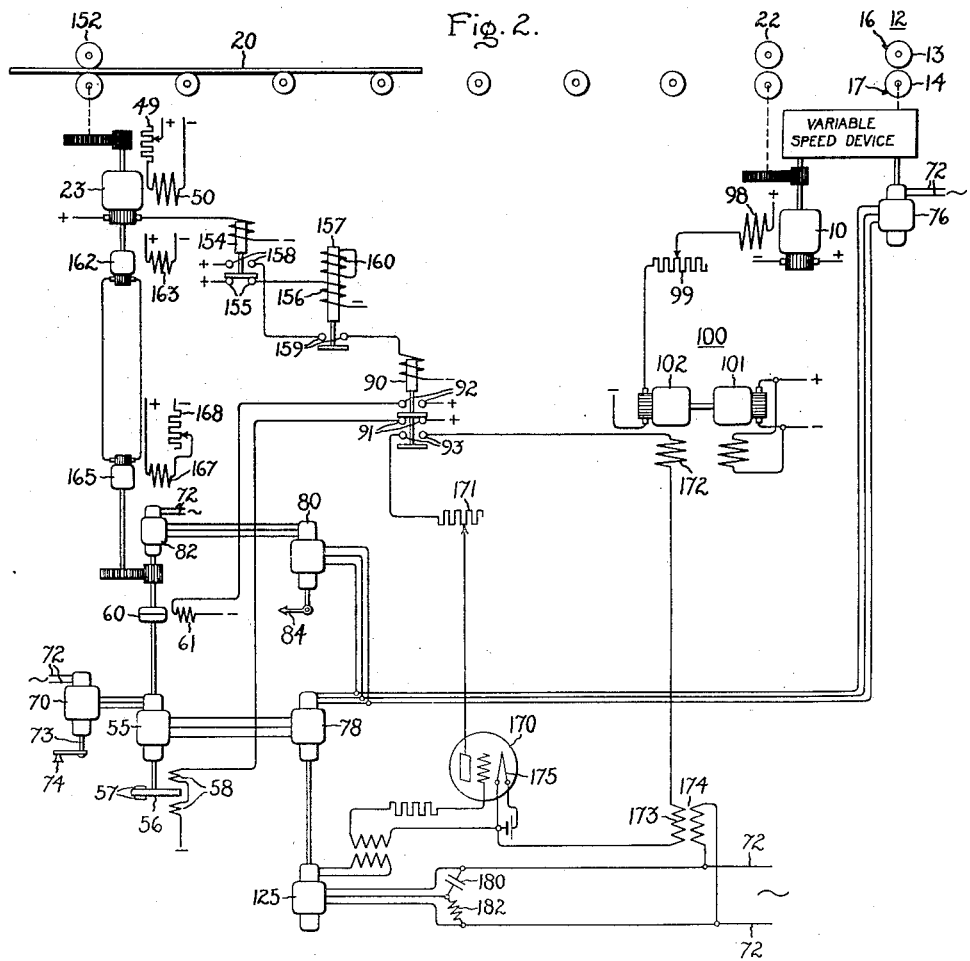
Inventor:
Thomas R. Rhea,
Leonid A. Umansky,
by Harry E. Dunham
Their Attorney.

Patented Dec. 3, 1935

2,023,243

UNITED STATES PATENT OFFICE 2,023,243

CONTROL SYSTEM

Thomas R. Rhea and Leonid A. Umansky, Schenectady, N. Y., assignors to General Electric Company, a corporation of New York Application June 8, 1933, Serial No. 674,894

12 Claims. (Cl. 164—68)

Our invention relates to control systems, more particularly to the speed control of machines of the type arranged for operation on a length of material, and has for an object the provision of such a control system which is reliable and efficient in operation.

Although it obviously has other applications, our invention is particularly useful in connection with flying shears of the type used for severing bars of metal. These bars of metal are generally driven through the flying shear after the rolling mill has reduced them to predetermined dimensions.

Heretofore, the first crop from each piece of stock or length of metal has represented a loss because the length of the first crop has been indeterminate; that is to say, the stock may enter the shear while its knives are in some indeterminate angular position. Therefore the length of the first crop may vary from a few inches to the full length of the cut. By the law of averages it may be assumed therefore that the average length of the first crop may equal approximately one-half the length of the cut. The loss in tonnage represented in the course of the day's run becomes quite appreciable, and it is a further object of our invention to eliminate this loss.

It has been proposed to control the length of the first crop by stopping the rotary shear with the blades occupying a definite angular position after the cutting of each bar has been completed. The next bar as it approached the shear was arranged to control the energization of the shear motor, so that the blades or knives of the shear occupied a predetermined position after the bar entered the shear. Much is yet to be desired in this type of control, because driving motors of very substantial sizes are required in order to accelerate the rotating portion of the shear to full speed in the time which is available. The problem becomes increasingly more difficult as the delivery speed of the stock is increased. The time for accelerating the motors is further diminished if the finishing stand is located close to the shears.

In carrying out our invention, in one form thereof, a flying shear is driven continuously, and means are provided whereby the blades of the shear will occupy a definite angular position when the front end of a bar reaches a definite position in its travel. More specifically, we provide a position-determining device arranged to be accelerated from a definite angular position whenever the leading end of a bar of metal arrives at a predetermined distance from the shear. This definite angular position corresponds to the position that the blades should occupy. A second position-determining device is driven in angular agreement with the blades of the shear. By means of a differential-positioning device the angular position of the blades is compared with the position which the blades should occupy. The differential-positioning device is arranged to accelerate or to retard temporarily the shear driving motor so as to eliminate the angular displacement, or in other words to bring the blades into the position which they should occupy. The differential-positioning device thereafter serves to maintain the speed of the shear so that the blades thereafter are maintained in the proper position to sever the bar into predetermined lengths.

It will be understood that in accordance with our invention the force involved to accelerate or to retard the flying shear is considerably smaller than the force required to start the shear from rest and to stop it between each consecutive bar. Consequently an appreciable saving in the capacity of the machines is obtained and the operating costs are correspondingly less.

For a more complete understanding of our invention reference should be had to the drawings wherein we have shown diagrammatically in Fig. 1 our invention applied to the control of a flying shear while in Fig. 2 we have shown a modified form of our invention.

Referring to the drawings, we have shown our invention in one form as applied to a direct current motor 10 connected by the gearing 11 to drive a flying shear 12. The shear 12 consists of two revolving drums 13 and 14, each of which carries, respectively, the blades 16 and 17.

Steel bars or other types of stock, for example the bar 20, are arranged to be driven from a rolling mill 22 to the rotary shear 12. The rolling mill 22 is driven by a motor 23. Inasmuch as the last operation in the production of steel bars of a given dimension is completed before the bar is cut into predetermined lengths, it will be understood that the rolling mill 22 represents the last finishing stand. As long as the bar 20 is in the rolls of the finishing stand 22, the speed of the bar is determined entirely by the speed at which the motor 23 drives the rolls. However, after the tail end of the bar 20 leaves the finishing stand 22 it is obvious that its speed no longer depends on the speed of the motor 23. Therefore, in order to maintain the accuracy of the cuts a pair of pinch rolls 25 are provided adjacent the shear 12. The pinch rolls 25 are driven by the motor 10 the connection including a variable speed drive 26 and the gears 11 and 27. By shifting the belt 28 on the cone pulleys 29 and 30 of the variable speed drive the speed of the pinch rolls 25 may be adjusted to correspond to the proper delivery speed of the stock or bar 20. The length of each cut is determined by the ratio of the speed of the mill and of the shear 12, and after the bar leaves the finishing stand by the ratio of the speed of the pinch rolls 25 and of the shear 12. Therefore, a movable pointer 32 connected to the belt 28 is arranged to be movable over a calibrated scale 34, calibrated in terms of the length of cut. It will be assumed that in the position shown the length of cut is 10 feet. The speed of the motor 23 driving the rolls of the finishing stand 22 is now adjusted so that the delivery speed of the bar 20 from the finishing stand will correspond with the speed at which the pinch rolls 25 will drive the bar through the shear. To assist in making this adjustment the speed indicator 40 is provided with a coil 41 connected in circuit with a tachometer generator 42. A second coil 44 on the indicator 40 is connected across the armature of a second tachometer generator 45 driven by the motor 23. The coils 41 and 44 act differentially on the pointer 46 of the indicator. When the speed of the rolls of the finishing stand corresponds to the speed of the pinch rolls 25, the pointer 46 occupies a central position. As shown the speed of the motor 23 is adjusted by means of a rheostat 49 connected in circuit with the separately excited field winding 50 provided for the motor.

In accordance with the present invention the motor 10 is energized to drive the shear 12 continuously. Under these conditions in order to predetermine the length of the first crop made by the shear, it is necessary to insure that the blades 16 and 17 occupy a definite angular position (which angular position will insure a predetermined length of the first crop) as the leading end of the bar 20 arrives at the shear. It will further be understood that if the bar 20 is driven at a predetermined speed by the rolls of the finishing stand 22 and by the pinch rolls 25, the angular positions that the blades 16 and 17 should occupy as the leading end of the bar 20 leaves the finishing stand can readily be determined. Therefore, the angular positions which the blades 16 and 17 shall occupy are compared with the angular positions that they actually occupy as the leading end of the bar leaves the finishing stand 22 and the difference, or the angular displacement, is eliminated by retarding or accelerating the motor 10 until the blades 16 and 17 occupy the predetermined angular positions. In this manner the length of the first crop is determined. In Fig. 1 this is accomplished by providing a position-determining device 55, the rotor of which is normally maintained in a predetermined position by means of a disk 56 provided with magnetic inserts 57. The magnetic inserts are arranged to be attracted by the coils 58 so that the rotor of the position-determining device 55 is always brought to a standstill in a predetermined position. This means for bringing the rotor of the position determining device to a standstill in a predetermined angular position forms no part of our invention, and it is described and claimed in a copending application of Stewart H. White, Serial No. 674,890, filed June 8, 1933, assigned to the same assignee as this application.

The position-determining device itself is provided with a distributed three-circuit rotor winding (not shown) and with a distributed three-circuit stator winding (not shown). Devices of this type are described and claimed in U. S. Patent 1,612,117—Hewlett et al.—December 28, 1926.

The rotor of the device 55 is arranged to be connected to the motor 23 by means of a magnetic clutch 60 provided with an operating coil 61. Between the magnetic clutch and the motor 23 there is interposed a variable speed mechanism 63 consisting of cone pulleys 64 and 65, a belt 66 and a belt shifter 67. The variable speed mechanism 63 is driven from the motor 23 by means of the gears 68.

The rotor circuit of the device 55 is connected to the stator circuit of a second device 70. This device has a single circuit rotor winding (not shown), the terminals of which are connected to a single phase source of supply represented by the reference numeral 72. This winding is mounted on a shaft 73 provided with an operating handle 74 whereby the inductive relation of the rotor winding with respect to the stator winding can be varied as may be desired. This device is described and claimed in U. S. Patent 1,637,039 to Hewlett et al. dated July 26, 1927.

A position-sending device 76 is driven by the shear driving motor 10 and is of a construction similar to the device 70. Its single circuit rotor winding (not shown) is energized by the single phase, alternating current source of supply 72, while its three-circuit stator winding is connected to the three-circuit rotor winding of a differential receiving device 78. A three-circuit stator winding (not shown) of the device 78 is connected to the stator winding of the device 55.

The position that the blades of the shear should occupy when the leading end of the bar 20 arrives at a predetermined distance from the shear 12 is determined by the device 55. When the bar reaches this predetermined point, the magnetic clutch 60 is energized to rotate the position-determining device 55 at the same speed as that at which the shears should rotate. This speed relation is obtained by means of the mechanism 63. In order to assist in fixing this speed a differential receiving device 80 is provided and has its three-circuit stator winding connected to the stator winding of the position-sending device 76, while its three-circuit rotor winding is connected to the three-circuit stator winding (not shown) of a device 82 provided with a single circuit rotor winding (not shown) arranged to be energized from the alternating current source of supply 72. The belt shifter 67 is operated until a pointer 84 driven by the rotor of the device 80 remains stationary. As long as there is a difference in speed between the rotors of the devices 76 and 82 the pointer 84 will rotate. As soon as it remains stationary, however, an indication is had that the belt 66 has been properly adjusted.

A flag switch 86 is arranged to be operated to closed circuit position whenever the leading end of a bar, for example the bar 20, strikes the operating member 87 of the switch. A spring 88 normally biases the switch to the open circuit position. Assuming that the bar 20 has closed the switch 86, it will be observed that an energizing circuit is completed for the operating coil 89 of a relay 90. The relay 90 is thereupon free to open its normally closed contacts 91 to interrupt a normally energized circuit including the coils 58 and to close its contacts 92 and 93. Consequent to the closing of the contacts 92 an energizing circuit is completed for the operating coil 61 of the clutch 60. The clutch 60 thereupon connects the rotor of the position-determining device 55 to the variable speed mechanism. The rotor of the position-determining device 55 will be rotated at the same speed as the rotor of the position-sending device 76. It will be remembered that the rotor of the position-determining device 55 was held stationary at the angular position that the blades 16 and 17 should occupy when the leading end of the bar 20 operated the flag switch. Consequently, if the blades 16 and 17 are not in this predetermined angular position the rotor of the position-sending device 76 will be in a different position with respect to its stator winding than is the rotor of the device 55. Under these conditions it will be understood that the respective voltages applied to the differential receiving device 78 are displaced with respect to each other, thereby moving the rotor of the device 78 an amount proportional to the angle of displacement between the two devices 55 and 76. The speed of the motor 10 is then varied until this angular difference disappears. When the rotors of the devices 55 and 76 are in angular agreement with each other, the blades 16 and 17 occupy the predetermined angular positions which will result in a predetermined crop of the bar 20 when it arrives at the shear 12.

The energization of a separately excited field winding 98 provided on the motor 10 is controlled by means of a rheostat 99 and a motor generator set 100. A motor 101 is energized from a suitable source of direct current supply. A generator 102 is provided with a pair of field windings 104 and 105. The field winding 104 is connected by the conductor 106 to one side of the secondary winding 108 of a transformer 109 provided with a primary winding 110. The other side of the field winding 104 is connected to the anode 111 of an electric valve 112. The field winding 105 is connected by conductor 113 to the other side of the transformer secondary winding 108. The other side of the field winding is connected to an anode 117 of an electric valve 118. The valves 112 and 118 are preferably of the type having an inert gas, such as mercury vapor, within their envelopes. It will be understood that when the respective grids 120 and 121 of the valves 112 and 118 are made sufficiently positive with respect to the anodes, the valves become conductive.

The grid circuits of the valves include a transformer 123, the primary of which is energized from the single circuit winding (not shown) of the device 125, the stator winding (not shown) being connected to the contacts 93 of the relay 90 and to the single phase source of supply 72. The rotor of the device 125 is mechanically connected to the rotor of the differential position-determining device 78. It will also be observed that the primary winding 110 of the transformer 109 is arranged to be energized by means of the contact 93 from the single phase source of supply 72. The cathodes 127 and 128 with their respective valves 112 and 118 are energized from a suitable source of supply and are connected by means of the conductor 130 to the mid-point of the transformer secondary winding 108 and also by conductor 131 to the mid-point of the secondary winding of the transformer 123. The rotor of the device 125 normally occupies a position with respect to its stator winding such that no voltage is applied to the primary winding of the transformer 123. However, if an angular disagreement is indicated by the differential device 78 it will, of course, be understood that the rotor of the device 125 is moved from this neutral position. The consequent change in the relative positions of the stator and rotor windings causes a resultant voltage to be produced on the primary winding of the transformer 123. The polarity of this voltage is determined by the direction of rotation of the rotor winding. If, for example, the differential device 78 rotates the rotor of the device 125 in a clockwise direction, the voltage applied to the primary of the winding of the transformer 123 may cause a voltage to be produced on the grid 121 which will render the valve 118 conductive. The movement of the rotor of the device 125 in the opposite direction will then cause a voltage to be applied to the grid 120 of the valve 112 to render this valve conductive. Accordingly, the field winding 104 will be energized in a direction to produce a voltage of one polarity on the generator 102 and the field winding 105 is arranged to produce an opposite polarity on the generator. Assuming now that the rotor of the device 125 has moved in a clockwise direction to cause the valve 118 to become conductive, it will be observed that the field winding 105 will be energized. The generator 102 will thereupon produce a voltage in a direction to reduce the voltage which is normally applied to the field winding 98 of the motor 10 by the direct current source of supply. This causes the motor 10 to increase its speed. As soon as the angular disagreement between the position which the blades of the shear occupy and the position which they should occupy is eliminated, the differential device 78 moves the rotor of the device 125 to its neutral position, and the valve 118 again becomes non-conductive. The voltage of the generator 102 disappears and the shears again rotate at their normal speed. Assuming now that the angular disagreement is in the opposite direction so that the differential device 78 operates the rotor of the device 125 in a counter-clockwise direction, it will be seen that the valve 112 is rendered conductive. The resultant energization of the field winding 104 causes the generator 102 to produce a voltage which adds to that of the direct current supply. The increase in the excitation produced by the field winding 98 decreases the speed of the motor 10 until the angular disagreement has been wiped out.

In addition to temporarily varying the speed of the shear driving motor 10 the speed modifying means also serves to maintain a predetermined relation between the speed of the shear and the speed of the rolls of the rolling mill 22. For example, if the speed of either the shear driving motor 10 or the mill driving motor 23 should change after the bar has operated the flag switch 86, the differential device 78 will immediately indicate the change in the relative speeds. The electric valve speed controlling means will immediately function to vary temporarily the speed of the shear driving motor 10 so that the blades 16 and 17 of the shears 12 always occupy their predetermined positions.

If the first crop taken by the shear happens to be too long or too short, the handle 74 of the device 70 is rotated an amount which is estimated to insure the desired length of crop. The result of rotating the rotor of the device 70 with respect to its stator is to change the electrical relationship between the device 55 and the device 78 by causing an angular displacement of the voltage which is applied to the rotor of the device 55. This serves as the electrical equivalent of actually changing the angular position from which the rotor of the position-determining device 55 is accelerated. If the crop of the first length of material is greater or less than that desired, it will be understood that the handle 74 is again rotated for an estimated correction. In ordinary practice it requires but a few adjustments of the device 70 to obtain the desired length of the first crop.

Assuming now that the tail end of the bar 20 is leaving the flag switch it will be observed that the spring 88 operates to open the contacts 86a. The opening of these contacts deenergizes the operating winding 89 of the relay 90, which relay after a predetermined time interval operates to open its contacts 92 and 93 and to close its contacts 91. The opening of the contacts 92 deenergizes the clutch 60 while the opening of the contacts 93 deenergizes the speed controlling means.

Consequent to the closing of the contacts 91 of the relay 90, the magnet coils 58 are energized, which coils serve to stop the disk 56 with the magnetic member positioned between the coils. The apparatus is now in readiness for the next bar and functions in the same manner as we have just explained as soon as its leading end operates the flag switch 87.

The time delay opening of the relay 90 is accomplished by means of a short circuited coil 135. By delaying the opening of the contacts 92 and 93 of this relay more time is obtained for correcting the position of the shears. This additional time might be necessary in case it is found desirable to locate the flag switch 87 not behind the finishing stand 22, as shown, but ahead of it.

It will be remembered that the pinch rolls 25 were provided to maintain the speed of the bar 20 at proper value because the shears 12 were located a substantial distance from the finishing stand 22. If the pinch rolls 25 had not been provided the speed of the bar 20 would not have been fixed during its whole travel from the finishing stand 22 to the shears 12.

In Fig. 2 we have shown our invention in one form as applied to a rolling mill wherein the shears 12 and the finishing stand 22 are spaced apart a short distance. Accordingly, the pinch rolls 25 have been omitted and the motor 10 used to drive the rolls of the finishing stand 22, is also used to drive the shear. As shown, the preceding stand 152 is located a substantial distance from the last finishing stand 22 so that sufficient time will elapse during the travel of the bar from one stand to the other to permit the adjustment of the shear blades. Assuming that the speed of the motor 23 driving the stand 152 is set at a predetermined speed with reference to rolls 22 and therefore to the shears 12, it will be observed that as the leading end of the bar 20 enters the stand 152 a relay 154, responsive to the current of the motor 23, is operated to interrupt by means of its normally closed contacts 155 an energizing circuit for a coil 156 provided on a timing relay 157 and to complete a circuit through its contacts 158 and through contacts 159 of the timing relay a circuit for the operating coil of the relay 90. The timing relay 157 is provided with a short circuited coil 160 which serves to maintain the timing relay closed for a time which approximates the time required for the bar 20 to travel from the stand 152 to the stand 22.

The position-determining device 55 is arranged to be operated from a predetermined position as in the case of Fig. 2. In this form of our invention, however, a direct current generator 162 provided with a separately excited field winding 163 is connected in local circuit with a direct current motor 165 provided with a separately excited field winding 167. For a given speed of the generator 162 the speed of the motor 165 may be adjusted by means of its field rheostat 168. In this manner the speed at which the position-determining device 55 rotates can be adjusted so as to correspond to the speed of the shears 12.

The speed control means includes an electric valve 170 having its output circuit connected through a variable resistance 171, contacts 93 of the relay 90, field winding 172 of the generator 102, secondary winding 173 of transformer 174 and to the cathode 175 of the valve 170. Preferably the field winding 172 is connected so that the generator 102 serves to increase the field excitation of the motor 10. The direct current output of the valve 170 is controlled by means of the device 125 provided with a single circuit rotor winding and a three circuit stator winding. By means of a phase converting apparatus, shown as capacitor 180 and reactor 182, the three circuit winding is directly connected to the single phase source of supply 72.

This manner of controlling the electric valve is fully described in U. S. Patent 1,655,036 to Alexanderson et al., January 3, 1928 and in this specification will be briefly described by saying that the time of starting of current in electric valve 170 may be controlled for each half cycle. Therefore, the average flow of current which may flow through the field winding 172 is directly proportional to the difference in the angular positions of the rotors of the devices 55 and 76. It follows that the change in speed of the driving motor 10 caused by the voltage generated by the booster generator 102 also varies in proportion to the angular disagreement between the rotors of the devices 55 and 76. For example, if there is a substantial disagreement between the device 55 and the device 76 after the clutch 60 has operated to accelerate the device 55 from the predetermined position, it will be understood that the voltages applied to the differential receiving device 78 are displaced a corresponding amount. Consequently, the differential device 78 rotates the rotor winding of the device 125 an amount proportional to the displaced voltages. The result is a shift of the phase of the grid voltage of the valve 170 with respect to its anode voltage so that the valve 170 becomes conductive over a substantial part of each half cycle. The booster generator 102 thereupon increases the excitation of the field winding 98 of the motor 10, thereby decreasing its speed a substantial amount. As the blades 16 and 17 of the shears 12 are operated into angular position the increased excitation produced by the generator 102 diminishes. When the blades reach the positions which they should occupy as determined by the device 55 and the setting of the device 70, the motor 10 is again rotating at its former speed but the shear blades 16 and 17 are now in their corrected positions.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States, is:

1. Means for controlling a machine arranged to perform operations on a moving strip of material so that its operations occur at predetermined points on said strip, comprising driving means for said machine, driving means for said strip, means responsive to the position of said strip for indicating the desired angular position of said machine when said strip is a predetermined distance from said machine, and means controlled by said last mentioned means for temporarily varying the speed of said machine with respect to said strip so as to establish said desired angular position of said machine.

2. The combination with a rotary shear arranged to sever strips of material into predetermined lengths, of means for continuously driving said shear, material driving means located a predetermined distance from said shear for driving said material to said shear, means for indicating a desired angular position of said shear when the leading end of said material is a predetermined distance from said shear, and means controlled by said last mentioned means for varying the angular position of said shear with respect to the leading end of said material until said desired angular relation is obtained.

3. The combination with a rotary shear arranged to sever strips of material into predetermined lengths, of means for continuously driving said shear, means located a predetermined distance from said shear for driving said strip of material to said shear, a position-determining device normally at rest in a definite angular position, means responsive to the travel of said strip for accelerating said device to the speed of said shear, means responsive to the angular disagreement between the shear and said device for temporarily modifying the speed of said shear until said device and said shear are brought into angular agreement and for maintaining said angular agreement.

4. Means for predetermining the length of the first cut of a strip of material arranged to be driven through a pair of rotary shears comprising a motor for driving said shears continuously, a position-determining device, a pilot motor arranged to accelerate said device from a predetermined angular position to the speed of said shears, and means responsive to the angular difference between said device and said shears for controlling the speed of said shears so as to bring said device and said shears into angular agreement.

5. Means for controlling a machine arranged to perform operations on a strip of material so that its first operation occurs at a predetermined point on said material comprising motor driving means for said machine, material driving means for said strip, a position-determining device, means for producing an electromotive force upon positional disagreement of said machine and said device corresponding in value and direction to the amount and direction of said positional disagreement, and a pair of electric valves responsive to said electromotive force for controlling said motor driving means so as to bring said machine into positional agreement with said position-determining device.

6. Means for predetermining the length of the first crop of a strip of material arranged to be driven through a rotary shear provided with a pair of cutting blades, comprising a motor for driving said shear, speed control means for said motor, a pair of driving rolls arranged a predetermined distance from said shear to drive said strip to said shear, means for driving said rolls, a position-determining device normally at rest in an angular position corresponding to the angular position which the blades of said shear should occupy when said strip enters said rolls, a pilot motor arranged to accelerate said position-determining device to a speed corresponding to the speed of said shear, means responsive to the arrival of said strip between said driving rolls for connecting said pilot motor and said position-determining device, a position sending device driven by said shear, a differential position-receiving device responsive to said position-determining device and to said position setting device for operating said speed control means so as to bring said shears into positional agreement with said position-determining device.

7. Means for controlling a machine arranged to perform operations on a strip of material so that its operation occurs at a predetermined point on said material comprising motor driving means for said machine, driving means located a predetermined distance from said machine for said strip, a position-determining device, means for accelerating said position-determining device from a predetermined angular position to the speed of said machine whenever said strip of material enters said driving means, timing means therefor arranged to decelerate said position-determining device after a predetermined interval of time, and means for stopping said position-determining device in a predetermined angular position.

8. In a system for maintaining a predetermined relationship between a length of material and an element operating thereon, the combination of driving means for said material, a position-determining device, a driving motor therefor, a generator mechanically connected to said driving means, connections for connecting said generator in a local circuit with said driving motor so that the speed of said motor will vary directly with variations in the speed of said generator, a driving means for said operating element, and means actuated in accordance with the position of said element and cooperating with said position determining device for controlling one of said driving means to establish a predetermined positional relationship between said length of material and said element.

9. The method of predetermining the length of the first crop of a strip of material arranged to be driven through a rotary shear which consists in determining the angular position of said shear with respect to the leading end of said material which will establish the desired length of crop, comparing the actual position of said shear therewith when said strip is a predetermined distance therefrom, and varying the angular position of said shear with respect to said leading end of said strip until the desired angular position is obtained.

10. The method of establishing a predetermined relationship between an apparatus arranged to perform operations on a moving strip of material and said strip which consists in determining the position said apparatus should occupy with respect to said strip of material, causing said apparatus to be decelerated below its normal speed to vary its relationship with respect to said strip, and thereafter gradually increasing the speed of said apparatus to said normal speed so that said predetermined relationship is established as said normal speed is resumed.

11. The method of establishing a predetermined relationship between an apparatus arranged to perform operations on a moving strip of material and said strip which consists in determining the position said apparatus should occupy with respect to said strip of material, varying from their normal speeds the relative speeds of said apparatus and said strip to change their relationship with each other and reestablishing their normal speeds with said apparatus in said predetermined relation with said strip.

12. In a system for maintaining a predetermined relationship between two moving objects, the combination of a position-sending device driven by each of said objects, a differential position-receiving device electrically connected to said sending devices, means for stopping one of said position-sending devices in a predetermined angular position, and means for varying the electrical relationship between said one sending device and said receiving device.

THOMAS R. RHEA.
LEONID A. UMANSKY.